United States Patent
Coudurier

(10) Patent No.: US 9,319,678 B2
(45) Date of Patent: Apr. 19, 2016

(54) KEYFRAME ALIGNMENT FOR ENCODING VIDEO AT MULTIPLE BITRATES

(71) Applicant: Hulu, LLC, Santa Monica, CA (US)

(72) Inventor: Baptiste Coudurier, Los Angeles, CA (US)

(73) Assignee: HULU, LLC, Santa Monica, CA (US)

( * ) Notice: Subject to any disclaimer, the term of this patent is extended or adjusted under 35 U.S.C. 154(b) by 399 days.

(21) Appl. No.: 13/901,353

(22) Filed: May 23, 2013

(65) Prior Publication Data

US 2014/0177733 A1 Jun. 26, 2014

Related U.S. Application Data

(60) Provisional application No. 61/740,253, filed on Dec. 20, 2012.

(51) Int. Cl.
| | |
|---|---|
| *H04N 7/12* | (2006.01) |
| *G06F 15/16* | (2006.01) |
| *H04N 19/46* | (2014.01) |
| *H04N 21/234* | (2011.01) |
| *H04N 21/2343* | (2011.01) |
| *H04N 19/107* | (2014.01) |
| *H04N 19/142* | (2014.01) |

(52) U.S. Cl.
CPC ....... *H04N 19/00545* (2013.01); *H04N 19/107* (2014.11); *H04N 21/23418* (2013.01); *H04N 21/23439* (2013.01); *H04N 19/142* (2014.11)

(58) Field of Classification Search
CPC .......... H04N 21/23418; H04N 19/107; H04N 21/23439; H04N 19/142
See application file for complete search history.

(56) References Cited

U.S. PATENT DOCUMENTS

| | | | |
|---|---|---|---|
| 2003/0123546 A1* | 7/2003 | Falik ................ | H04N 21/23424 375/240.12 |
| 2006/0013306 A1* | 1/2006 | Kim ....................... | H04N 19/52 375/240.12 |
| 2010/0027621 A1* | 2/2010 | Yano ...................... | H04N 19/61 375/240.03 |
| 2012/0128061 A1* | 5/2012 | Labrozzi ........ | H04N 21/234354 375/240.02 |

* cited by examiner

*Primary Examiner* — Heather Jones
*Assistant Examiner* — Tsion B Owens
(74) *Attorney, Agent, or Firm* — Fountainhead Law Group PC

(57) ABSTRACT

In one embodiment, a method receives a frame type storage medium including frame type decisions made by a first encoding process to encode a video at a first bitrate to generate a first encoded video. While performing a second encoding process to encode the video at a second bitrate to generate a second encoded video, the method performs: retrieving information from the storage medium regarding a frame type decision made during the first encoding process; inserting a keyframe in the second encoded video based on the retrieved information from the storage medium, wherein the inserted keyframe in the second encoded video is aligned with a corresponding keyframe in the first encoded video; and continuing to retrieve information from the storage medium and inserting keyframes in the second encoded video. Keyframes in the first encoded video are aligned with keyframes in the second encoded video.

20 Claims, 8 Drawing Sheets

KEYFRAME ALIGNMENT FOR ENCODING VIDEO AT MULTIPLE BITRATES

CROSS REFERENCE TO RELATED APPLICATIONS

The present disclosure claims priority to U.S. Provisional App. No. 61/740,253, entitled "Keyframe Alignment for Encoding Video at Multiple Bitrates", filed Dec. 20, 2012, the contents of which is incorporated herein by reference in its entirety.

BACKGROUND

Delivery of video content is available through a mobile device or other living room-connected devices, such as personal computers or set-top boxes. Different protocols may be used to stream the video. One protocol is hypertext transfer protocol (HTTP) live streaming (HLS). The HLS protocol delivers video over HTTP via a playlist of small segments that are made available in a variety of bitrates typically from a content delivery network (CDN). This allows a media player to switch bitrates on a segment-by-segment basis. The switching helps compensate for network bandwidth variances that may occur during playback of the video.

To allow a media player to switch between bitrates, the segments for each bitrate must be aligned. That is, if the media player switches from a first stream of a first bitrate to a second stream of a second bitrate, a segment in the second stream must be aligned at the same time as a segment of the first stream that was about to be played. For example, the media player may play segment #9 from the first stream at the first bitrate. If the media player is about to play a segment #10 at the first bitrate, but switches to the second stream at the second bitrate, segment #10 from the stream at the second bitrate should start at the same time as segment #10 of the first stream at the first bitrate. If the segments are not aligned, then the video would become choppy as some video might be skipped because the time that segment #9 ended would not be continuous with the time that segment #10 of the second stream starts.

To force the alignment between multiple bitrate encodings, an encoder would encode a video file at a first bitrate. A user would program where an encoder inserts keyframes. For example, the user may choose that a keyframe is inserted every 60 seconds. Then, when the encoder encodes the video file, the encoder inserts a keyframe every 60 seconds. When the video is encoded at the second bitrate, the encoder inserts keyframes at the same 60-second intervals. This process continues for as many numbers of bitrates that are encoded. By forcing the keyframes to be inserted at the same times, each encoding at a different bitrate would have the keyframes that are aligned. This allows all the streams to be segmented at keyframes that reside in the same position. For example, each segment may be 60 seconds long and is split at a keyframe. However, by forcing the keyframes to be inserted every 60 seconds, the keyframes may be inserted at undesirable points. For example, it may be desirable to have the keyframe boundaries at points where there is a scene change or a discontinuity in motion. This allows frames within the segment to leverage the information within the segment for motion estimation and compensation more efficiently. However, if a keyframe boundary occurs where continuous motion is occurring, then the encoding becomes less efficient because motion information that is in a next segment cannot be leveraged because only motion information in the present segment can be used in motion estimation and compensation.

SUMMARY

In one embodiment, a method receives a frame type storage medium including information for frame type decisions made by a first encoding process to encode a video at a first bitrate to generate a first encoded video at the first bitrate. The frame type decisions were made based on characteristics of the video. While performing a second encoding process to encode the video at a second bitrate to generate a second encoded video at the second bitrate, the method performs: during the second encoding process, retrieving information from the frame type storage medium regarding a frame type decision made during the first encoding process of the video at the first bitrate; inserting a keyframe in the second encoded video based on the retrieved information from the frame type storage medium, wherein the inserted keyframe in the second encoded video is aligned with a corresponding keyframe in the first encoded video; and continuing to retrieve information from the frame type storage medium and inserting keyframes in the second encoded video until the video is encoded at the second bitrate. Keyframes in the first encoded video at the first bitrate are aligned with keyframes in the second encoded video at the second bitrate.

In one embodiment, a non-transitory computer-readable storage medium is provided containing instructions, that when executed, control a computer system to be configured for: receiving a frame type storage medium including information for frame type decisions made by a first encoding process to encode a video at a first bitrate to generate a first encoded video at the first bitrate, wherein the frame type decisions were made based on characteristics of the video; and while performing a second encoding process to encode the video at a second bitrate to generate a second encoded video at the second bitrate, performing: during the second encoding process, retrieving information from the frame type storage medium regarding a frame type decision made during the first encoding process of the video at the first bitrate; inserting a keyframe in the second encoded video based on the retrieved information from the frame type storage medium, wherein the inserted keyframe in the second encoded video is aligned with a corresponding keyframe in the first encoded video; and continuing to retrieve information from the frame type storage medium and inserting keyframes in the second encoded video until the video is encoded at the second bitrate, wherein keyframes in the first encoded video at the first bitrate are aligned with keyframes in the second encoded video at the second bitrate.

In one embodiment, a system is provided comprising: one or more computer processors; and a non-transitory computer-readable storage medium comprising instructions, that when executed, control the one or more computer processors to be configured for: receiving a frame type storage medium including information for frame type decisions made by a first encoding process to encode a video at a first bitrate to generate a first encoded video at the first bitrate, wherein the frame type decisions were made based on characteristics of the video; and while performing a second encoding process to encode the video at a second bitrate to generate a second encoded video at the second bitrate, performing: during the second encoding process, retrieving information from the frame type storage medium regarding a frame type decision made during the first encoding process of the video at the first bitrate; inserting a keyframe in the second encoded video based on the retrieved information from the frame type storage medium, wherein the inserted keyframe in the second encoded video is aligned with a corresponding keyframe in the first encoded video; and continuing to retrieve information from the frame type storage medium and inserting keyframes in the second encoded video until the video is encoded at the second bitrate, wherein keyframes in the first encoded video at the first bitrate are aligned with keyframes in the second encoded video at the second bitrate.

The following detailed description and accompanying drawings provide a better understanding of the nature and advantages of particular embodiments.

DETAILED DESCRIPTION

Described herein are techniques for an encoding system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Figure 1A:
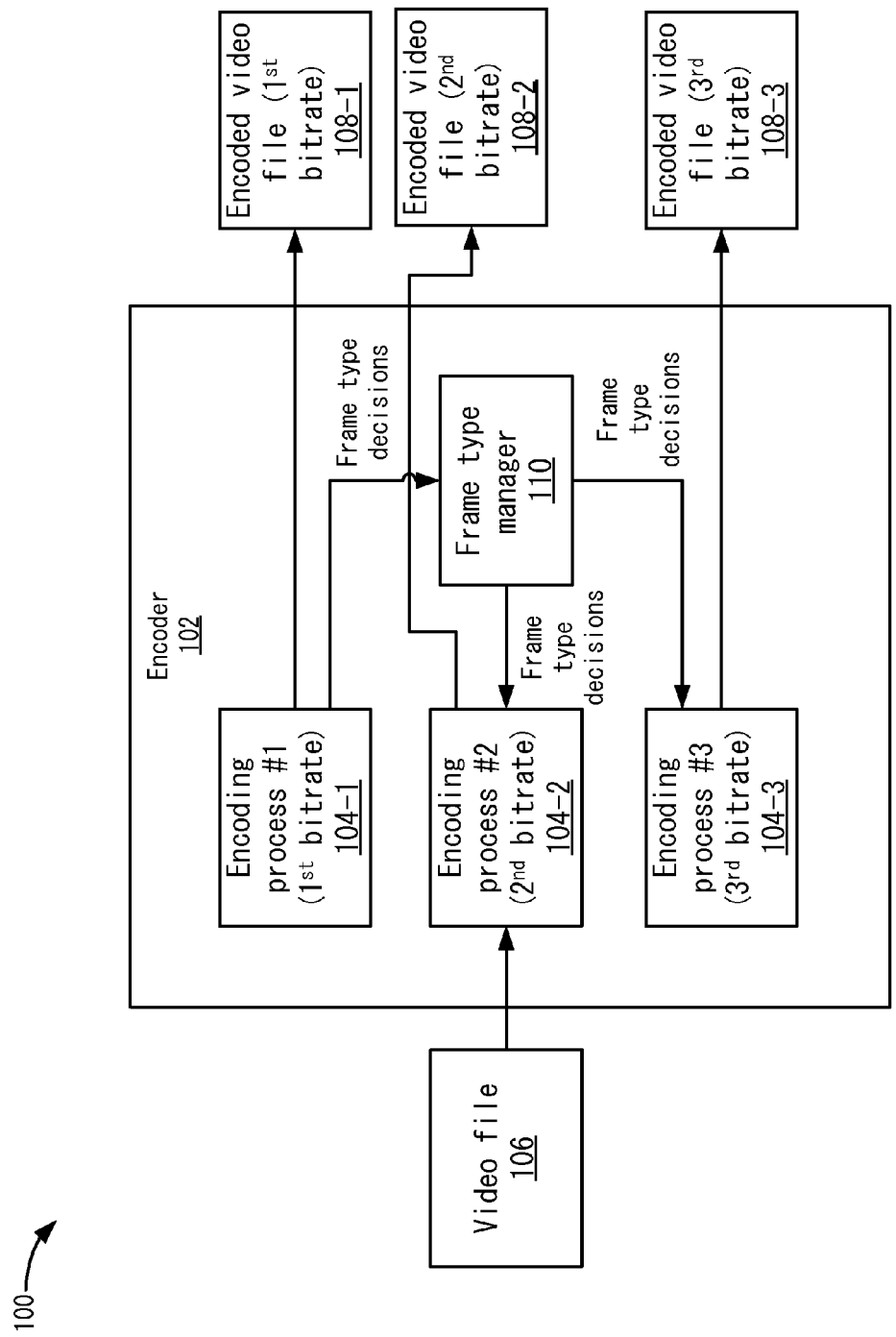
FIG. 1A depicts an example of an encoder according to one embodiment.

FIG. 1A depicts an example of an encoder 102 according to one embodiment. Encoder 102 includes multiple encoding processes 104-1-104-3 (it will be understood that two or more encoding processes at two or more bitrates may be used). In one embodiment, encoder 102 may be the same encoder that encodes a video file 106 at multiple bitrates. In other embodiments, encoder 102 may include multiple encoders that encode video file 106 at different bitrates. As shown, an encoding process 104-1 encodes video file 106 at a first bitrate; encoding process 104-2 encodes video file 106 at a second bitrate; and encoding process 104-3 encodes video file 106 at a third bitrate. The first, second, and third bitrates may be low, medium, and high bitrates, where a higher bitrate represents a higher quality video.

Each encoding process 104 outputs an encoded video file 108. For example, encoding process 104-1 outputs encoded video file 108-1, which includes video encoded at the first bitrate; encoding process 104-2 outputs an encoded video file 108-2, which includes video encoded at the second bitrate; and encoding process 104-3 outputs an encoded video file 108-3, which includes video encoded at the third bitrate. Keyframes in encoded video files 108 are aligned such that the files can be segmented at the same times and used in hypertext transfer protocol (HTTP) live streaming (HLS) or any other streaming protocol that requires segments to be aligned. Segments need to be created at a keyframe. The keyframe includes all information needed to decode the keyframe. Thus, a first frame of a segment should be a keyframe so the decoder can decode the keyframe without referencing other frames in the segment. By aligning the keyframes at the same position in the encoded video, segments of video can be created at the keyframes and are thus aligned. For example, a segment may start at every keyframe. Thus, when a media client switches bitrates for a segment, the segment for the new bitrate is aligned with a segment for the old bitrate.

Figure 1B:
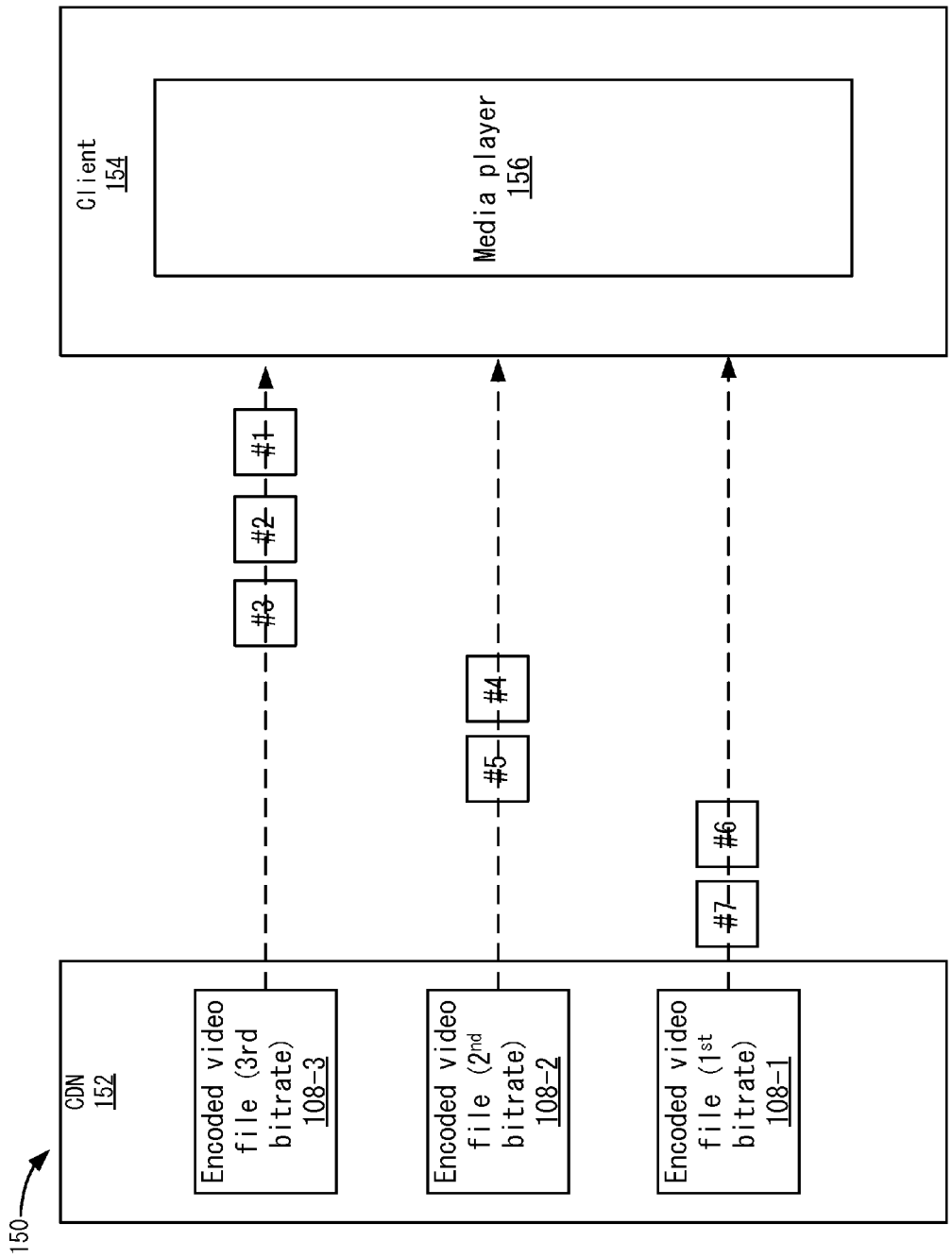
FIG. 1B shows an example of a system that switches between delivery of streams of different bitrates according to one embodiment.

FIG. 1B shows an example of a system 150 that switches between delivery of streams of different bitrates according to one embodiment. System 150 includes a content delivery network (CDN) 152 that includes one or more servers (not shown) that can stream video content to a client 154. Although one CDN and one client 154 are shown, it will be understood that any number of CDNs and clients 154 may be used.

Client 154 includes a media player 156 that can render the video. In one example, media player 154 sends requests to CDN 152 for segments of video. The request may specify which segment of the video and which bitrate to send. For example, media player 156 may request a high bitrate when available network bandwidth is high and a low bitrate when network bandwidth is low. As shown, CDN 152 is storing encoded video files 108-1, 108-2, and 108-3, which have been encoded at the first bitrate, second bitrate, and third bitrate, respectively. In one example, media player 156 requests segments #1, #2, and #3 at the third bitrate. CDN 152 sends these segments from encoded video file 108-3. At this point, available bandwidth may be high and media player 156 requests a high bitrate version of the encoded video. Then, media player 156 requests segments #4 and #5 at the second bitrate. CDN 152 sends these segments from encoded video file 108-2. At this point, the available bandwidth may have gone down. After which, media player 156 requests segments #6 and #7 at the first bitrate. CDN 152 sends these segments from encoded video file 108-1. At this point, the available bandwidth may be low and media player 156 requests the lowest bandwidth version of the encoded video.

As discussed above, when switching between bitrates, the segments must be aligned. For example, the end of segment #3 in encoded video file 108-3 should be aligned with the end of segment #3 in encoded video file 108-2. Thus, when CDN 152 switches the stream from encoded video file 108-3 to encoded video file 108-2, segment #4 in encoded video file 108-2 starts at the point that segment #3 in encoded video file 108-3 ended. Similarly, when CDN 152 switches the stream from encoded video file 108-2 to encoded video file 108-1, segment #6 in encoded video file 108-1 starts at the point that segment #5 in encoded video file 108-2 ended.

Referring back to FIG. 1A, a frame type manager 110 is used to align the keyframes in encoded video files 108. For example, encoding process 104-1 may encode video file 106 and determine optimal positions in which to place keyframes during encoding. The keyframe may also be referred to an intra-frame (I frame) and includes all information that is needed by a decoder to decode the keyframe. The I frame is different from a frame that requires information from another frame to be decoded, such as a P- or B-frame. In a P or B frame, blocks may be P or B blocks where these blocks derive information from another block. That is, only the differences of a P or B block are encoded and when decoding the P or B block, information from another block is used along with the differences to recreate the P or B block. Accordingly, a segment should be created only at a keyframe. If a segment is created at a frame that requires information from another frame, then that frame may be dependent on information that is not in the segment. Because a segment is created at a keyframe, the keyframe can be decoded without referencing any other frames. Thus, when switching bitrates, the first frame that should be received at media player 156 is a keyframe such that media player 156 can decode the keyframe at the different bitrate.

When encoding process 104-1 determines the keyframes, encoding process 104-1 outputs information to frame type manager 110 to allow keyframes to be aligned from encodings at other bitrates. For example, encoding process 104-1 may note each frame type decision that is made. For example, for every frame type decision that is made, the type of frame is stored in the file. In this example, each frame type decision, such as P, B, or I, is recorded in the file. Also, because every frame type decision is stored in the file, the position of each frame may not need to be stored. That is, each encoding process at a different bitrate would sequentially insert each frame type in order. In another example, the positions of only the keyframes may be noted and stored in a file. For example, the keyframes may be inserted at the 0 second, 60 second, 150 second, etc. positions in the video. Then, the subsequent encodings would insert keyframes at these positions.

Frame type manager 110 provides information (e.g., the frame type or position) to encoding process 104-2 and encoding process 104-3 to allow encoding process 104-2 and encoding process 104-3 to align keyframes with keyframes in encoding process 104-1. For example, encoding process 104-2 and encoding process 104-3 insert keyframes in the same position as encoding process 104-1. Additionally, encoding process 104-2 and encoding process 104-3 may make the same frame type decisions as encoding process 104-1. For example, if encoding process 104-1 made the frame type decisions of I, B, B, P . . . I, then encoding process 104-2 and encoding process 104-3 make the same frame type decisions in the same order in the encoded video.

By enforcing the frame type decision to be the same as encoding process 104-1, alignment of keyframes is achieved. For example, if segments are split at keyframes in the same position in the encoded videos, the segments are aligned.

Figure 2:
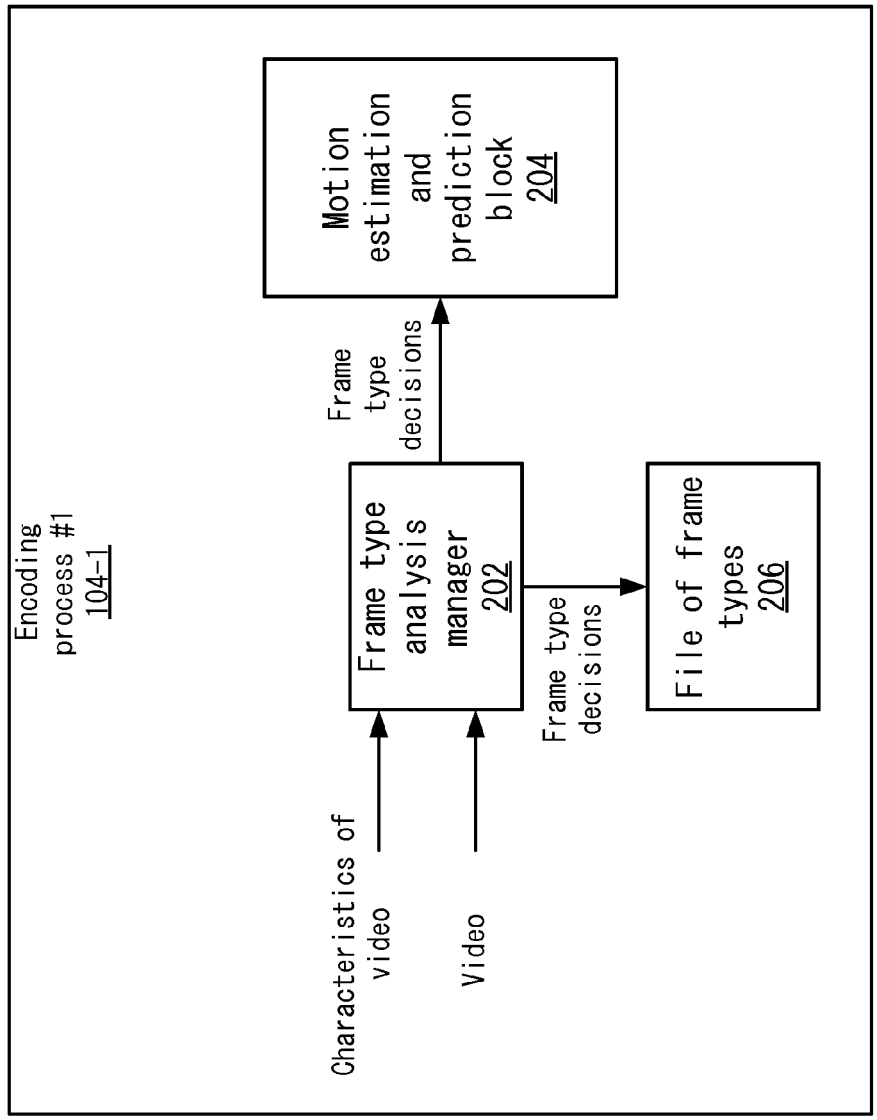
FIG. 2 depicts a more detailed example of a first encoding process according to one embodiment.

FIG. 2 depicts a more detailed example of encoding process 104-1 according to one embodiment. A frame type analysis manager 202 receives characteristics of video. Frame type analysis manager 202 analyzes the characteristics and determines a frame type. The frame type is output to a motion estimation and compensation block 204. Motion estimation and compensation block 204 performs motion estimation and compensation using the frame type. Other parts of the encoding process are not shown, but a person of skill in the art will appreciate how the encoding process works. If the frame type is I, then only intra predication can be used. If the frame type is P, then intra-(I) and uni-(P) predication can be used If the frame type is B, then intra-(I), uni-(P), and bi-(B) prediction can be used. Frame type analysis manager 202 may determine the frame type and also the position of the frames based on various characteristics of the video. For example, frame type analysis manager 202 may determine where to place keyframes in the encoded video. The keyframes may be placed in what frame type analysis manager 202 considers an optimal position, such as when scene changes occur or discontinuities in motion. Frame type analysis manager 202 is free to make decisions as to what type of frame to select and also where to place keyframes.

Frame type analysis manager 202 outputs the determined frame types to a file of frame types 206. File 206 may be any storage medium that can store the file types. For example, file 206 is stored on random access memory (RAM) or read-only memory (ROM), portable storage, disk storage, etc. The storage medium may also be a database that is queried for the frame type decisions. Although file will be used for discussion purposes, any storage medium may be used. In one embodiment, every frame type and position is stored in file 206. In other examples, only the positions of keyframes are stored in file 206.

Figure 3A:
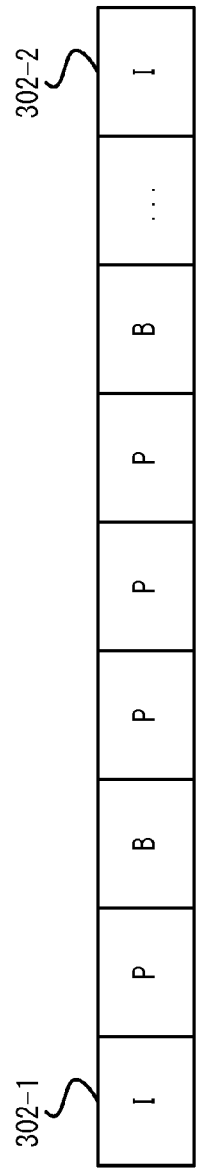
FIG. 3A depicts an example of the frame type decisions made by a frame type analysis manager according to one embodiment.

FIG. 3A depicts an example of the frame type decisions made by frame type analysis manager 202 according to one embodiment. As shown, the frame type sequence may be I, P, B, P, P, P, B, . . . I, and so on. Keyframes are shown at 302-1 and 302-2.

Figure 3B:
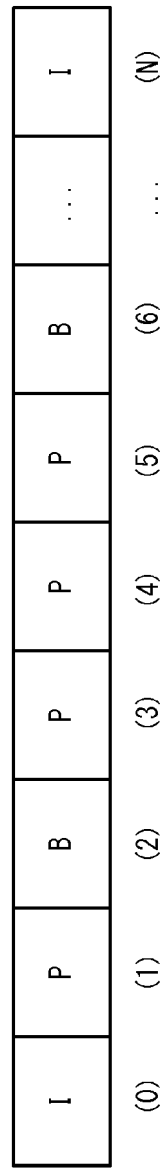
FIG. 3B shows an example of a file that can store the frame types shown in the frame type sequence of FIG. 3A according to one embodiment.

FIG. 3B shows an example of a file that can store the frame types shown in the frame type sequence of FIG. 3A according to one embodiment. File 206 may include an array 310 that stores the frame type decisions in each position of the array. For example, in a position #0, the frame type decision of I is stored. In one example, an identifier may be stored, such as a number or binary number that identifies it as an I-frame. In a position #1, the frame type of P is stored. Another identifier for the P-frame type may be stored in position #1. In position #2 of array 310, the frame type of B is stored. A third identifier indicating the B-frame type may be stored. This process continues as array 310 is filled with frame type identifiers based on the frame type sequence of FIG. 3A.

Figure 3C:
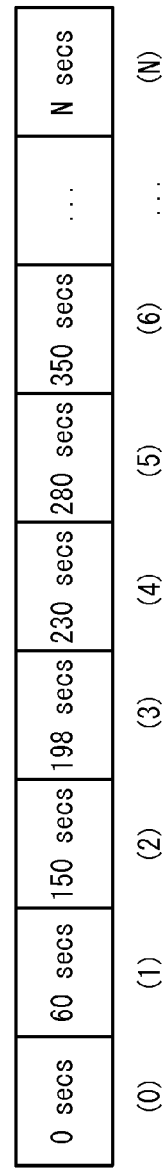
FIG. 3C shows another example of a file that can store the keyframe types shown in the frame type sequence of FIG. 3A according to one embodiment.

FIG. 3C shows another example of a file that can store the keyframe types shown in the frame type sequence of FIG. 3A according to one embodiment. A second array 312 may store positions for the keyframe. For example, in a position 0 of array 312, a position is stored for the keyframe at 302-1 in the frame type sequence. For example, the position may be indicated by a time, in seconds, such as 0 seconds. Since only the positions of the keyframes are stored, the next position of array 312 stores a position of the next keyframe shown at 302-2 in the frame type sequence. For example, at a position 1 of array 312, the position of 60 seconds is stored for a corresponding keyframe at 302-2. This process continues as the positions of all keyframes are stored.

Figure 4:
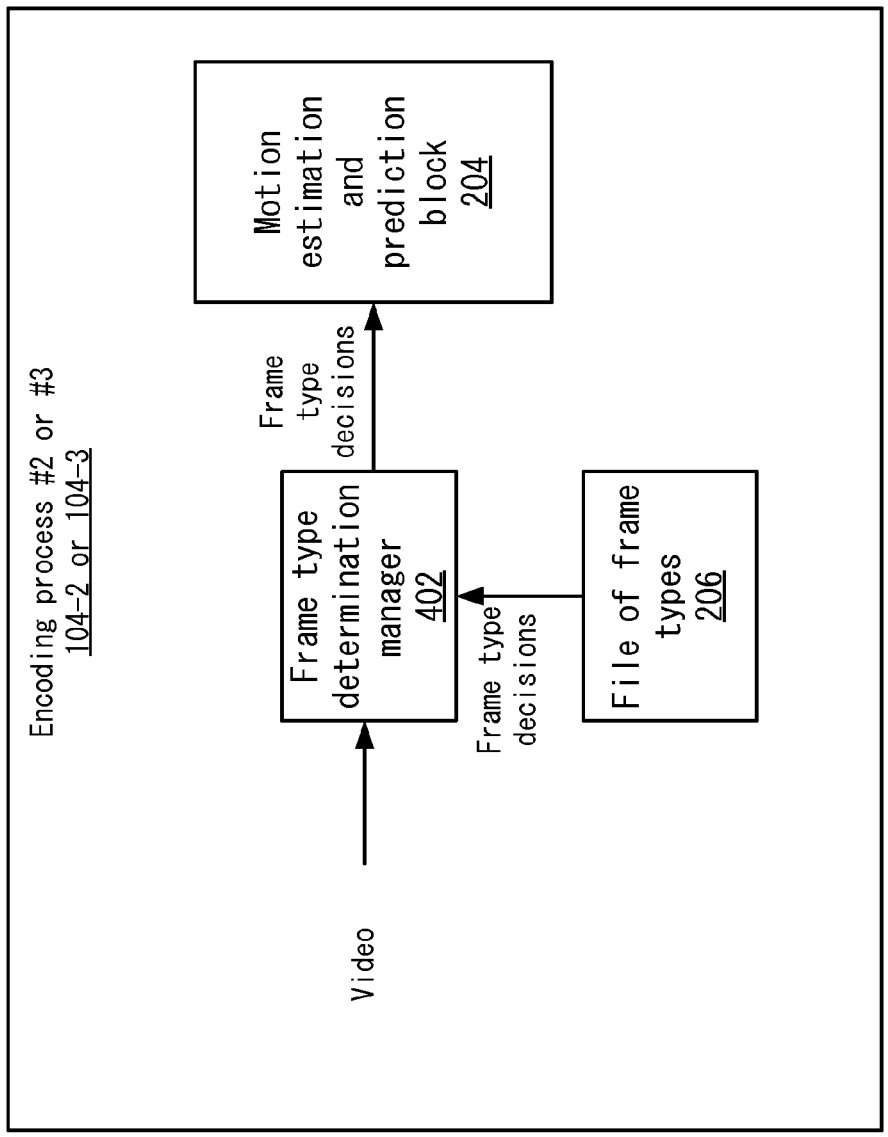
FIG. 4 depicts a more detailed example of a second or third encoding process according to one embodiment.

FIG. 4 depicts a more detailed example of encoding process 104-2 or 104-3 according to one embodiment. Instead of having a frame type analysis manager that analyzes characteristics of video to determine the frame type and position of frames in the encoded video, encoding process 104-2 or 104-3 include a frame type determination manager 402 that receives file 206 and determines the frame type and position based on information from file 206. Frame type determination manager 402 does not analyze characteristics to independently determine where to place keyframes in the encoded video. Rather, frame type determination manager 402 may read file 206 to determine where keyframes were placed in the first encoding process 104-1. Frame type determination manager 402 then outputs the frame type and position to motion estimation and compensation block 204. This is the same block as found in encoding process 104-1.

By determining the frame type and position based on information from file 206, and using the frame type and position in the encoding process, encoding process 104-2 and 104-3 align the keyframes in encoded video files 108-2 and 108-3, respectively, with the keyframes in encoded video file 108-1. That is, keyframes occur at the same positions in the encoded video for all bitrates. Thus, if video is segmented at keyframes, then the segments will be aligned for the encoded video at different bitrates.

In one embodiment, frame type determination manager 402 may read array 310 to determine a frame type. For example, for a frame #1, frame type determination manager 402 may read position 0 of array 310 to determine the frame type, which is a keyframe. For frame #2, frame type determination manager 402 may read position 1 of array 310 to determine the frame type, which is a P frame. Frame type determination manager 402 may continue to read corresponding positions of array 310 to determine various other frame types in sequence. For example, positions 2 and 3 indicate that B-frames should then be inserted. This process continues as frame determination manager 402 continually reads in a frame type from array 310 for each frame that is being encoded. In one example, frame type determination manager 402 may maintain a counter that reads sequential positions of array 310 as each frame is encoded by encoding process 104-2 or 104-3.

In another embodiment, frame type determination manager 402 may read array 312 to determine when to insert a keyframe. For example, for a keyframe #1, frame type determination manager 402 may read position 0 of array 310 to determine the position of the first keyframe, which may be at 0 seconds. For keyframe #2, frame type determination manager 402 may read position 1 of array 312 to determine the position of the second keyframe, which may be at 60 seconds. The positions may also correspond to frame numbers, such as position 0 is frame #1, position 1 is frame #2, etc. Frame type determination manager 402 may continue to read corresponding positions of array 312 to determine various other positions of keyframes. This process continues as frame determination manager 402 continually reads in keyframe positions from array 312 for each keyframe that is being encoded.

Figure 5:
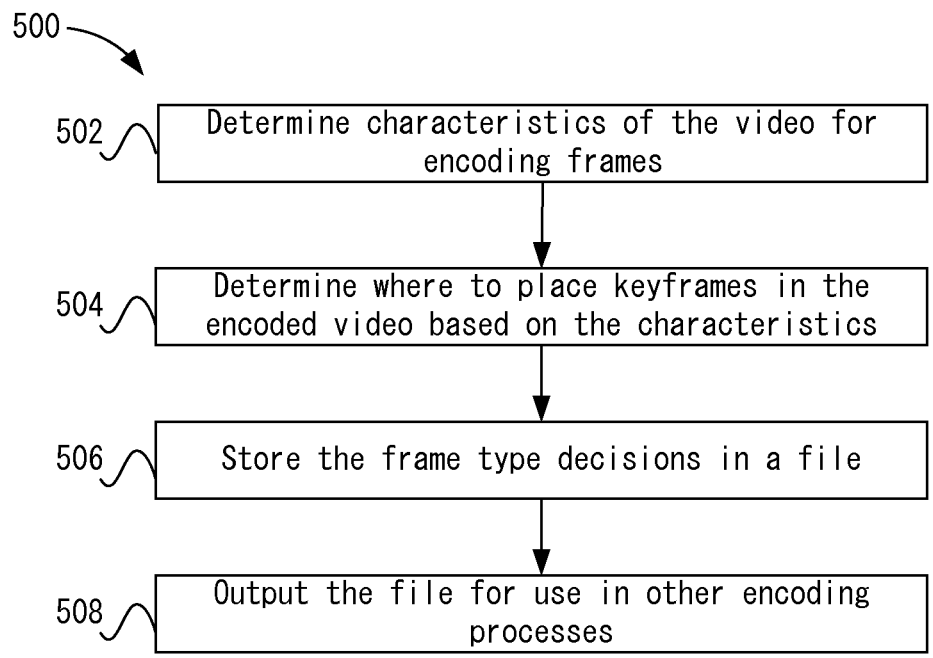
FIG. 5 depicts a simplified flowchart of a method for encoding video at a first bitrate according to one embodiment.

FIG. 5 depicts a simplified flowchart 500 of a method for encoding video at a first bitrate according to one embodiment. At 502, an encoding process 104-1 determines characteristics of the video for encoding frames. For example, motion information in the video may be analyzed.

At 504, encoding process 104-1 determines where to place keyframes in the encoded video based on the characteristics. At 506, encoding process 104-1 stores the frame type decisions in file 206. At 508, encoding process 104-1 outputs file 206 for use in other encoding processes.

Figure 6:
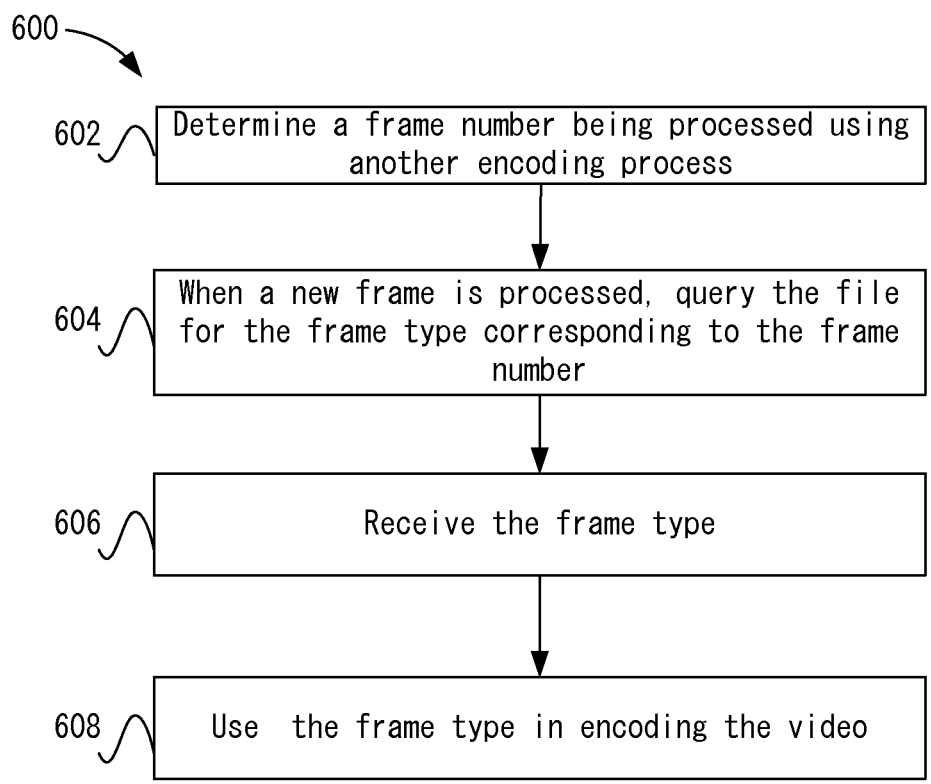
FIG. 6 depicts a simplified flowchart of a method for encoding video at multiple bitrates according to one embodiment.

FIG. 6 depicts a simplified flowchart 600 of a method for encoding video at multiple bitrates according to one embodiment. At 602, an encoding process (e.g., encoding process 104-2 or 104-3) determines a frame number being processed. For example, a counter may be used and incremented as each frame is encoded.

At 604, when a new frame is processed, the encoding process queries file 206 for the frame type corresponding to the frame number. At 606, the encoding process receives the frame type. For example, the frame type may be an I-, P-, or B-frame. At 608, the encoding process uses the frame type in encoding the video. For example, the frame type is inserted at a time that is aligned with encodings at other bitrates. This process continues for all the frames being encoded.

Accordingly, when the video is encoded at the different bitrates, the keyframes will be aligned in all encoded video files 108. Thus, the encoded video files encoded at different bitrates can be segmented according to the keyframe positions. In addition to having the keyframes aligned, by letting encoding process 104-1 choose where to insert the keyframes, the encoding process may be more efficient. The efficiency is achieved because the encoding process 104-1 makes the decision on where to insert the keyframes based on characteristics of the video that may optimally encode the video instead of arbitrarily inserting keyframes every 60 seconds.

Figure 7:
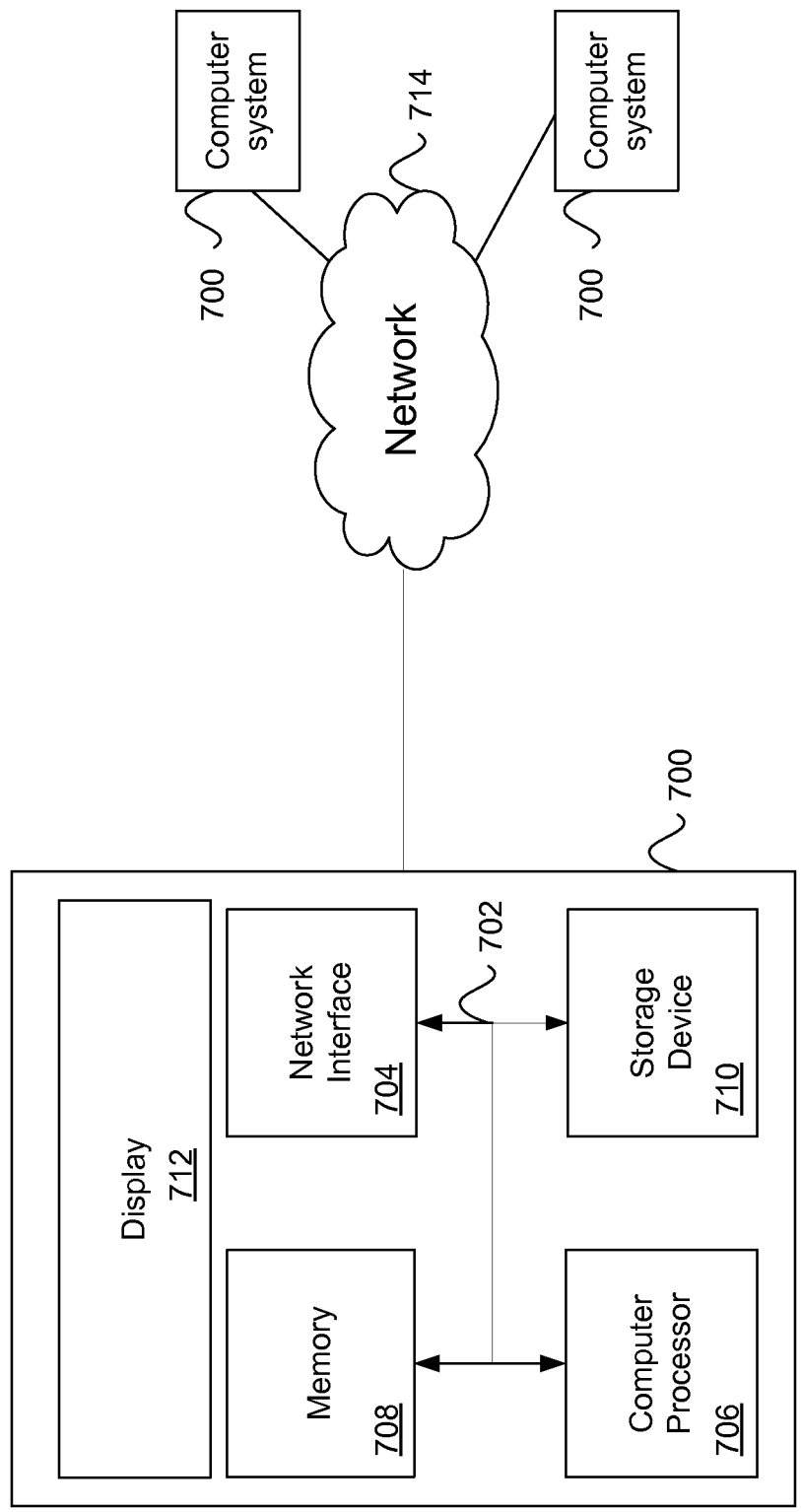
FIG. 7 illustrates an example of a special purpose computer system configured with an encoder according to one embodiment.

FIG. 7 illustrates an example of a special purpose computer system 700 configured with encoder 102 according to one embodiment. Computer system 700 includes a bus 702, network interface 704, a computer processor 706, a memory 708, a storage device 710, and a display 712.

Bus 702 may be a communication mechanism for communicating information. Computer processor 704 may execute computer programs stored in memory 708 or storage device 708. Any suitable programming language can be used to implement the routines of particular embodiments including C, C++, Java, assembly language, etc. Different programming techniques can be employed such as procedural or object oriented. The routines can execute on a single computer system 700 or multiple computer systems 700. Further, multiple processors 706 may be used.

Memory 708 may store instructions, such as source code or binary code, for performing the techniques described above. Memory 708 may also be used for storing variables or other intermediate information during execution of instructions to be executed by processor 706. Examples of memory 708 include random access memory (RAM), read only memory (ROM), or both.

Storage device 710 may also store instructions, such as source code or binary code, for performing the techniques described above. Storage device 710 may additionally store data used and manipulated by computer processor 706. For example, storage device 710 may be a database that is accessed by computer system 700. Other examples of storage device 710 include random access memory (RAM), read only memory (ROM), a hard drive, a magnetic disk, an optical disk, a CD-ROM, a DVD, a flash memory, a USB memory card, or any other medium from which a computer can read.

Memory 708 or storage device 710 may be an example of a non-transitory computer-readable storage medium for use by or in connection with computer system 700. The computer-readable storage medium contains instructions for controlling a computer system to be operable to perform functions described by particular embodiments. The instructions, when executed by one or more computer processors, may be operable to perform that which is described in particular embodiments.

Computer system 700 includes a display 712 for displaying information to a computer user. Display 712 may display a user interface used by a user to interact with computer system 700.

Computer system 700 also includes a network interface 704 to provide data communication connection over a network, such as a local area network (LAN) or wide area network (WAN). Wireless networks may also be used. In any such implementation, network interface 704 sends and receives electrical, electromagnetic, or optical signals that carry digital data streams representing various types of information.

Computer system 700 can send and receive information through network interface 704 across a network 714, which may be an Intranet or the Internet. Computer system 700 may interact with other computer systems 700 through network 714. In some examples, client-server communications occur through network 714. Also, implementations of particular embodiments may be distributed across computer systems 700 through network 714.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
   receiving a frame type storage medium including information for frame type decisions made by a first encoding process to encode a video at a first bitrate to generate a first encoded video at the first bitrate, wherein the frame type decisions were made based on characteristics of the video; and
   while performing a second encoding process to encode the video at a second bitrate to generate a second encoded video at the second bitrate, performing:
   during the second encoding process, retrieving information from the frame type storage medium regarding a frame type decision made during the first encoding process of the video at the first bitrate;
   inserting a keyframe in the second encoded video based on the retrieved information from the frame type storage medium, wherein the inserted keyframe in the second encoded video is aligned with a corresponding keyframe in the first encoded video;
   continuing to retrieve information from the frame type storage medium and inserting keyframes in the second encoded video until the video is encoded at the second bitrate, wherein keyframes in the first encoded video at the first bitrate are aligned with keyframes in the second encoded video at the second bitrate;
   while performing a third encoding process to encode the video at a third bitrate to generate a third encoded video at the third bitrate, performing:
   during the third encoding process, retrieving information from the frame type storage medium regarding the frame type decision made during the first encoding process of the video at the first bitrate;
   inserting a keyframe in the third encoded video based on the retrieved information from the frame type storage medium, wherein the inserted keyframe in the third encoded video is aligned with a corresponding keyframe in the first encoded video; and
   continuing to retrieve information from the frame type storage medium and inserting keyframes in the third encoded video until the video is encoded at the third bitrate, wherein keyframes in the first encoded video at the first bitrate are aligned with keyframes in the third encoded video at the third bitrate.

2. The method of claim 1, further comprising:
   performing the first encoding process of the video at the first bitrate; and
   storing the frame type decisions in the frame type storage medium while performing the first encoding process of the video at the first bitrate.

3. The method of claim 1, wherein every frame type decision for every frame made in the first encoding process is stored in the frame type storage medium.

4. The method of claim 3, wherein the second encoding process makes a same frame type decision as stored in the frame type storage medium for every frame encoded in the second encoding process.

5. The method of claim 1, wherein the information stored in the frame type storage medium includes information for keyframe type decisions for every keyframe in the first encoding process.

6. The method of claim 5, wherein the second encoding process inserts keyframes at a same position as keyframes in the first encoded video based on the information.

7. The method of claim 5, wherein only positions of keyframes are stored in the frame type storage medium.

8. A non-transitory computer-readable storage medium containing instructions, that when executed, control a computer system to be configured for:
   receiving a frame type storage medium including information for frame type decisions made by a first encoding process to encode a video at a first bitrate to generate a first encoded video at the first bitrate, wherein the frame type decisions were made based on characteristics of the video; and
   while performing a second encoding process to encode the video at a second bitrate to generate a second encoded video at the second bitrate, performing:
   during the second encoding process, retrieving information from the frame type storage medium regarding a frame type decision made during the first encoding process of the video at the first bitrate;
   inserting a keyframe in the second encoded video based on the retrieved information from the frame type storage medium, wherein the inserted keyframe in the second encoded video is aligned with a corresponding keyframe in the first encoded video;
   continuing to retrieve information from the frame type storage medium and inserting keyframes in the second encoded video until the video is encoded at the second bitrate, wherein keyframes in the first encoded video at the first bitrate are aligned with keyframes in the second encoded video at the second bitrate;
   while performing a third encoding process to encode the video at a third bitrate to generate a third encoded video at the third bitrate, performing:
   during the third encoding process, retrieving information from the frame type storage medium regarding the frame type decision made during the first encoding process of the video at the first bitrate;
   inserting a keyframe in the third encoded video based on the retrieved information from the frame type storage medium, wherein the inserted keyframe in the third encoded video is aligned with a corresponding keyframe in the first encoded video; and continuing to retrieve information from the frame type storage medium and inserting keyframes in the third encoded video until the video is encoded at the third bitrate, wherein keyframes in the first encoded video at the first bitrate are aligned with keyframes in the third encoded video at the third bitrate.

9. The non-transitory computer-readable storage medium of claim 8, further configured for:
performing the first encoding process of the video at the first bitrate; and
storing the frame type decisions in the frame type storage medium while performing the first encoding process of the video at the first bitrate.

10. The non-transitory computer-readable storage medium of claim 8, wherein every frame type decision for every frame made in the first encoding process is stored in the frame type storage medium.

11. The non-transitory computer-readable storage medium of claim 10, wherein the second encoding process makes a same frame type decision as stored in the frame type storage medium for every frame encoded in the second encoding process.

12. The non-transitory computer-readable storage medium of claim 8, wherein the information stored in the frame type storage medium includes information for keyframe type decisions for every keyframe in the first encoding process.

13. The non-transitory computer-readable storage medium of claim 12, wherein the second encoding process inserts keyframes at a same position as keyframes in the first encoded video based on the information.

14. The non-transitory computer-readable storage medium of claim 12, wherein only positions of keyframes are stored in the frame type storage medium.

15. A system comprising:
one or more computer processors; and
a non-transitory computer-readable storage medium comprising instructions, that when executed, control the one or more computer processors to be configured for:
receiving a frame type storage medium including information for frame type decisions made by a first encoding process to encode a video at a first bitrate to generate a first encoded video at the first bitrate, wherein the frame type decisions were made based on characteristics of the video; and
while performing a second encoding process to encode the video at a second bitrate to generate a second encoded video at the second bitrate, performing:
during the second encoding process, retrieving information from the frame type storage medium regarding a frame type decision made during the first encoding process of the video at the first bitrate;
inserting a keyframe in the second encoded video based on the retrieved information from the frame type storage medium, wherein the inserted keyframe in the second encoded video is aligned with a corresponding keyframe in the first encoded video;
continuing to retrieve information from the frame type storage medium and inserting keyframes in the second encoded video until the video is encoded at the second bitrate, wherein keyframes in the first encoded video at the first bitrate are aligned with keyframes in the second encoded video at the second bitrate;
while performing a third encoding process to encode the video at a third bitrate to generate a third encoded video at the third bitrate, performing:
during the third encoding process, retrieving information from the frame type storage medium regarding the frame type decision made during the first encoding process of the video at the first bitrate;
inserting a keyframe in the third encoded video based on the retrieved information from the frame type storage medium, wherein the inserted keyframe in the third encoded video is aligned with a corresponding keyframe in the first encoded video; and
continuing to retrieve information from the frame type storage medium and inserting keyframes in the third encoded video until the video is encoded at the third bitrate, wherein keyframes in the first encoded video at the first bitrate are aligned with keyframes in the third encoded video at the third bitrate.

16. The apparatus of claim 15, further configured for:
performing the first encoding process of the video at the first bitrate; and
storing the frame type decisions in the frame type storage medium while performing the first encoding process of the video at the first bitrate.

17. The apparatus of claim 15, wherein every frame type decision for every frame made in the first encoding process is stored in the frame type storage medium.

18. The apparatus of claim 17, wherein the second encoding process makes a same frame type decision as stored in the frame type storage medium for every frame encoded in the second encoding process.

19. The apparatus of claim 15, wherein the information stored in the frame type storage medium includes information for keyframe type decisions for every keyframe in the first encoding process.

20. The apparatus of claim 19, wherein the second encoding process inserts keyframes at a same position as keyframes in the first encoded video based on the information.

* * * * *